Patented July 3, 1934

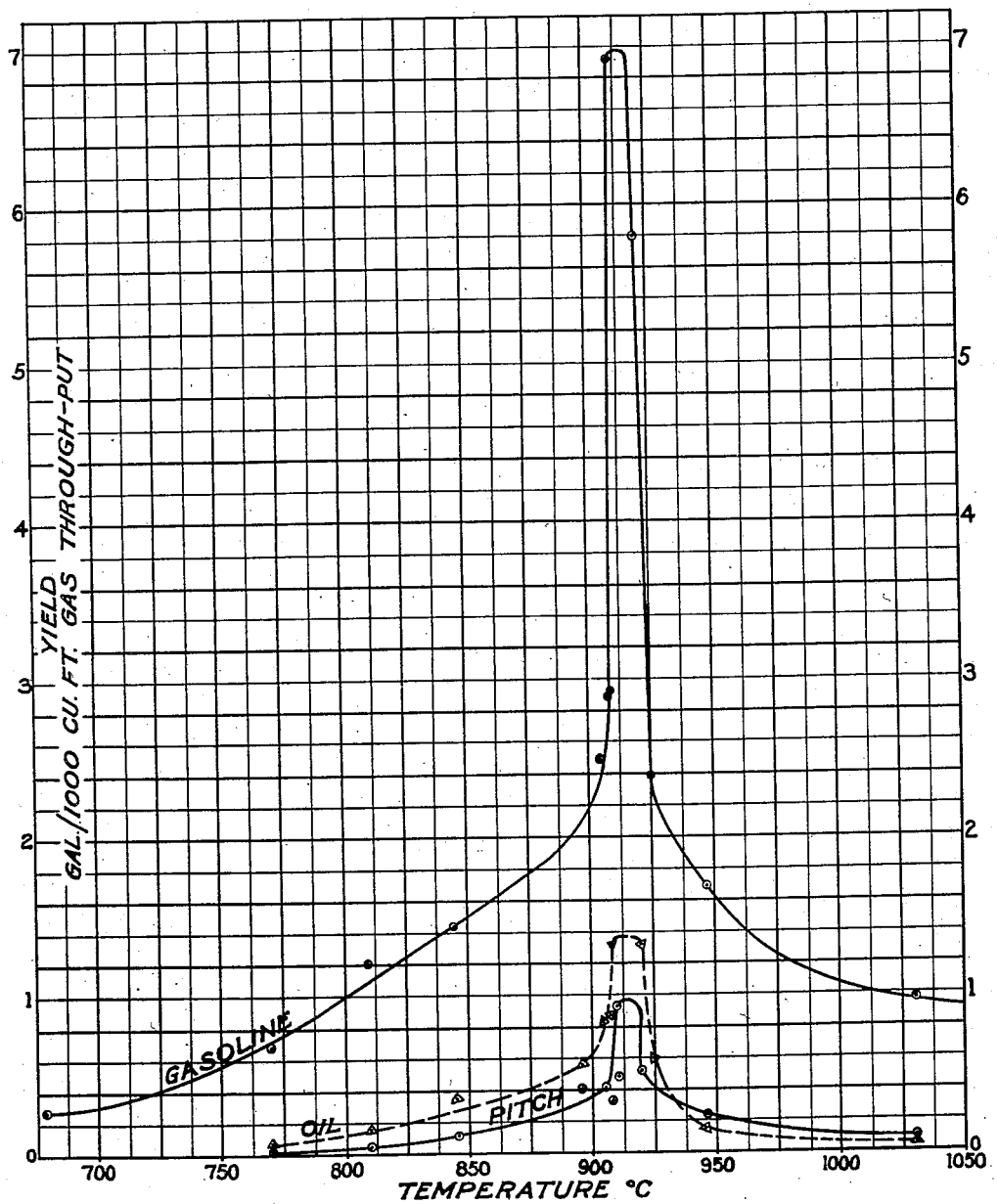

UNITED STATES PATENT OFFICE 1,965,135

PROCESS FOR THE PRODUCTION OF LIQUID HYDROCARBONS FROM HYDROCARBON GASES

Henry H. Chesny, Los Angeles, Calif., assignor to Union Oil Company of California, Los Angeles, Calif., a corporation of California Application October 20, 1930, Serial No. 489,984

7 Claims. (Cl. 196—10)

This invention relates to the polymerization and conversion of gaseous hydrocarbons into heavier liquid hydrocarbons, particularly into hydrocarbon fractions within the boiling point range of gasoline, and is particularly directed to the conversion of hydrocarbon gases containing a major proportion of propane.

I have found in the pyrolysis and polymerization of hydrocarbon gases such as those present in natural gas, especially hydrocarbon gases containing a major proportion of propane, that the production of liquid hydrocarbons within the boiling point range of gasoline is substantially augmented by operating at temperatures above 850° C. and are extraordinarily augmented by confining said pyrolysis within the range of 906–921° C. I have found that this temperature is an optimum one and that substantial departures therefrom result in a materially diminished yield. The temperatures to which I may heat such gases will be above 850° C.

It is an object of my invention to obtain large yields of liquid hydrocarbons within the boiling point range of gasoline by the pyrolysis and polymerization of hydrocarbon gases containing a major proportion of propane.

It is a further object of my invention to convert a gas containing a major proportion of propane by heating the same within a temperature range of approximately 900–950° C. and preferably within the range of 906 to 921° C.

It is an additional object to heat said gas in a non-ferric tube within said temperature range with or without a catalyst.

It is a further object of my invention to produce gasoline-like fractions from natural gas by absorbing the gasoline components from said natural gas and then heating the unabsorbed gas containing a major proportion of propane in a non-ferric tube to a temperature within the range of 906–921° C. and recovering the gasoline-like components therefrom.

By a gas containing a major proportion of propane I mean a gas containing a larger quantity of propane than any other component of which it may be comprised. For instance, by way of illustration of my invention, a gas of the following composition gave a high yield of desired fractions when treated by pyrolytic decomposition and polymerization at temperatures ranging from 906–921° C. The figures represent percentages by volume of the gas. It comprised methane 1.32%, ethane 5.42%, propane 76.59%, isobutane 16.07% and heavier homologues thereof 0.60%. This gas was the overhead fraction from a stabilizing column of a gasoline absorption plant.

The figure is a chart illustrating the relation between the temperatures of conversion and the yield of liquid products including gasoline, oil and pitch produced at said temperatures.

Referring to the chart, the advantage of my improvement can readily be seen. The abscissa scale represents the temperature in degrees centigrade. The ordinate scale represents the yield of gasoline, oil and pitch per thousand cubic feet of gas passing through the conversion and polymerization zone.

The following table may be used supplementary to the above described figure.

Relation between temperature of conversion and polymerization and the yields of gasoline, oil and pitch

| Temperature ° C. | Liquid products produced (Gal./1,000 cu. ft. of gas through-put) | | |
|---|---|---|---|
| | Gasoline | Oil | Pitch |
| 678 | 0.284 | 0.0 | 0.0 |
| 770 | .686 | .073 | .015 |
| 810 | 1.20 | .157 | .060 |
| 845 | 1.43 | .366 | .127 |
| 886 | 2.01 | .550 | .420 |
| 904 | 2.49 | .840 | .421 |
| 908 | 2.89 | .875 | .329 |
| 909 | 2.92 | 1.32 | .920 |
| 910 | 6.92 | 1.33 | .487 |
| 920 | 5.80 | 1.33 | .569 |
| 925 | 2.38 | .62 | .269 |
| 946 | 1.67 | .18 | .240 |
| 1030 | .95 | .064 | .075 |

The terms gasoline, oil and pitch refer to the liquid fractions produced by my process boiling up to 425° F., between 425° F. and 760° F., and to the still bottoms which remain unvaporized at 760° F., respectively.

The results tabulated above and set forth in the chart, were obtained by passing separate quantities of gas having the proportions above described through a quartz tube heated sufficiently to produce the temperatures above indicated in the gas. The temperature was sensitively controlled by varying the resistance of an electric current sent through electric heating means which comprised a coil disposed around the quartz tube.

It will be noted that the yield of gasoline is unexpectedly large when the temperature of conversion is controlled within the optimum limits. Likewise, within these limits, the yield of oil and pitch increases at a more rapid rate.

The total yield of liquid products will be obtained by adding the columns under gasoline, oil and pitch.

For instance, in operating at a conversion temperature of 770° C., the yield was 0.774 gallons of liquid products per thousand cubic feet of gas. The yield of gasoline was 0.686 gallons per thousand cubic feet of gas. When a temperature of 845° C. was used for conversion and polymerization, the yield was 1.923 gallons of liquid products per thousand cubic feet of gas. In this case 1.43 gallons of gasoline per thousand cubic feet of gas were produced.

By increasing the temperature of reaction, as I have discovered, I am able to obtain large increases in yields, particularly at a conversion temperature within the range of 906-921° C. For instance, in the illustration, at 910° C. there is a sudden increase in yield to 6.92 gallons of gasoline per thousand cubic feet of gas. I have found that by using other gaseous mixtures containing a major proportion of propane as above described that this increased yield is likewise apparent within the above mentioned temperature range.

A study of the appended chart shows a surprisingly sudden variation in yield as I pass from the optimum range. The chart illustrates that the yield begins to increase at a more rapid rate when the temperature of pyrolysis and polymerization is above 850° C. The yield attains its maximum between 906-921° C. and is still at a fairly high rate at 1050° C. or 1100° C. It is most practicable to operate at the optimum temperature within the range of 906-921° C., but maintaining the temperature of pyrolysis and polymerization within the temperature range of approximately 850-1100° C. will give excellent results.

As an example of the way in which the desired gas is obtained for my process, natural gas containing gasoline and other absorbable constituents is passed through an absorption tower or the like wherein the natural gas is freed substantially of gasoline. This gasoline is then stabilized in a stabilizing column or the like to free it from the so-called wild gases. These gases exiting therefrom contain a major proportion of propane and are compressed and liquefied for more convenient storage until used. This pressure would be about 150 lbs. for the gas described above. When ready for use, the liquefied propane mixture is drawn off from the storage and sent through a steam heated vaporizer or the like to insure constant composition. These steps merely involve one manner by which a gas containing a major proportion of propane can be obtained for subsequent pyrolysis and polymerization for the production of gasoline-like bodies. Many other ways of producing gas of the desired composition may be used by a person skilled in the art.

A preferred manner in which this gas containing a major proportion of propane is then treated comprises passing the gas under substantially atmospheric pressure through a reaction tube which may be heated by any conventional means such as by electric resistance coils. This reaction tube is non-ferric, and may be made of fused quartz or other ceramic material, or copper, or other metal not possessing anti-catalytic properties. The presence of iron in the reaction zone inhibits the formation of appreciable quantities of liquid hydrocarbons. The maximum temperature of the reacting gases within said tube will be over 850° C. and preferably will not exceed approximately 1100 or 1200° C. If desired, a catalyst may be used during the pyrolysis to aid the conversion of the hydrocarbon gas into gasoline-like components. As one example, this catalyst may be lustrous carbon coated on the tube by subjecting a small quantity of the gas to excessive pyrolysis. The reaction products issue from the reaction tube in the form of a mist and the liquid products are separated therefrom in the form of tar in any desired manner, such as by centrifuging. The gasoline which still remains in vapor form is then removed from the gases by absorption, condensation or other means. Any gasoline which may be present in the tar may be removed therefrom by distillation. The gasoline produced by this method has a high content of aromatic hydrocarbons and is especially suitable for use as an anti-knock motor fuel.

From the foregoing it will be observed that the elevation of temperature causes an increase of yield up to a temperature of approximately 910° C. and further increase causes a decrease of yield of gasoline. However, as will be observed by reference to the chart, the curve is roughly symmetrical about the 910° C. abscissa and good yields are obtained at the more elevated temperatures. The exact choice of the temperature will depend upon the physical characteristics of the equipment, such as capacity and efficiency of heat transfer and it will lie within the skill of the ordinary man skilled in the petroleum art to choose the correct temperature in view of the teachings of this specification and without departure from the scope of this invention.

It is to be understood that the above is merely illustrative of one manner of employing my invention of which many variations may be made by those skilled in the art without departing from the spirit thereof.

I claim:

1. A process of converting gaseous hydrocarbons containing a major proportion of propane into heavier liquid hydrocarbons which comprises subjecting said gaseous hydrocarbons to heat within a temperature range of approximately 900-925° C.

2. A process of converting gaseous hydrocarbons containing a major proportion of propane into heavier liquid hydrocarbons which comprises heating said gaseous hydrocarbons to a temperature within the range of 906-921° C.

3. A process of converting gaseous hydrocarbons containing a major proportion of propane into heavier liquid hydrocarbons which comprises heating said gaseous hydrocarbons to a temperature of approximately 910° C.

4. A process of converting gaseous hydrocarbons containing a major proportion of propane into heavier liquid hydrocarbons which comprises heating said gaseous hydrocarbons to a temperature within the range of 900-925° C. in the presence of lustrous carbon as a catalyst.

5. A process of converting gaseous hydrocarbons containing a major proportion of propane into heavier liquid hydrocarbons which comprises heating said gaseous hydrocarbons to a temperature within the range of 906-921° C. in the presence of lustrous carbon.

6. A process of converting gaseous hydrocarbons containing a proportion of propane approaching 75% into heavier liquid hydrocarbons which comprises heating said gaseous hydrocarbons to a temperature within the range of 900-925° C.

7. A process of converting gaseous hydrocarbons containing a proportion of propane approaching 75% into heavier liquid hydrocarbons which comprises heating said gaseous hydrocarbons to a temperature within the range of 900-925° C. in the presence of lustrous carbon as a catalyst.

HENRY H. CHESNY.